United States Patent
Hofmann et al.

(10) Patent No.: US 6,776,925 B2
(45) Date of Patent: *Aug. 17, 2004

(54) PROCESS FOR THE PREPARATION OF POLYETHER POLYOLS

(75) Inventors: Jörg Hofmann, Krefeld (DE); Stephan Ehlers, West Chester, PA (US); Bernd Klinksiek, Bergisch Gladbach (DE); Lars Obendorf, Köln (DE); Christian Steinlein, Ratingen (DE); Bert Klesczewski, Düsseldorf (DE); Jose F. Pazos, Havertown, PA (US)

(73) Assignees: Bayer Aktiengesellschaft, Leverkusen (DE); Bayer Polymers LLC, Pittsburgh, PA (US)

( * ) Notice: Subject to any disclaimer, the term of this patent is extended or adjusted under 35 U.S.C. 154(b) by 206 days.

This patent is subject to a terminal disclaimer.

(21) Appl. No.: 10/078,951

(22) Filed: Feb. 19, 2002

(65) Prior Publication Data

US 2002/0169229 A1 Nov. 14, 2002

(30) Foreign Application Priority Data

Feb. 22, 2001 (DE) ......................... 101 08 484

(51) Int. Cl.⁷ ............................ C08G 18/10; C09K 3/00
(52) U.S. Cl. ............................ 252/182.24; 252/182.27; 521/170; 521/174; 568/613; 568/619; 568/620; 568/621
(58) Field of Search ....................... 252/182.24, 182.27; 521/170, 174; 568/613, 619, 620, 621

(56) References Cited

U.S. PATENT DOCUMENTS

| | | |
|---|---|---|
| 3,404,109 A | 10/1968 | Milgrom |
| 3,829,505 A | 8/1974 | Herold |
| 3,941,849 A | 3/1976 | Herold |
| 4,533,254 A | 8/1985 | Cook et al. ................ 366/176 |
| 5,158,922 A | 10/1992 | Hinney et al. ............. 502/175 |
| 5,159,092 A | 10/1992 | Leuteritz .................. 554/149 |
| 5,482,908 A | 1/1996 | Le-Khac ................... 502/156 |
| 5,545,601 A | 8/1996 | Le-Khac ................... 502/156 |
| 5,627,120 A | 5/1997 | Le-Khac ................... 502/156 |
| 5,689,012 A | 11/1997 | Pazos et al. .............. 568/619 |
| 5,714,428 A | 2/1998 | Le-Khac ................... 502/159 |
| 5,777,177 A | 7/1998 | Pazos ...................... 568/679 |
| 5,803,600 A | 9/1998 | Schubert et al. ......... 366/144 |
| 5,902,042 A | 5/1999 | Imaizumi et al. ........ 366/176.2 |
| 5,919,988 A | 7/1999 | Pazos et al. .............. 568/679 |
| 6,018,017 A | 1/2000 | Le-Khac ................... 528/421 |
| 6,204,357 B1 | 3/2001 | Ooms et al. .............. 528/409 |
| 6,291,388 B1 | 9/2001 | Hofmann et al. ......... 502/154 |
| 6,323,375 B1 | 11/2001 | Hofmann et al. ......... 568/613 |

FOREIGN PATENT DOCUMENTS

| | | |
|---|---|---|
| CA | 2302984 | 9/2000 |
| DE | 198 42 383 | 3/2000 |
| DE | 199 24 672 | 11/2000 |
| DE | 199 28 156 | 12/2000 |
| EP | 0 050 312 | 10/1981 |
| EP | 0 654 302 | 5/1995 |
| EP | 0 853 975 | 7/1998 |
| FR | 1181577 | 6/1959 |
| JP | 4-145123 | 5/1992 |
| WO | 99/19062 | 4/1999 |
| WO | 99/33562 | 7/1999 |

OTHER PUBLICATIONS

Kunststoffhandbuch, vol. 7, 3$^{rd}$ edition (month unavailable) 1993, pp. 193–252, Polyurethane Pur–Weichschaumstoff, Dr. Baatz, Dr. A Freitag, H. Grammes, Dr. H.W. Illger, Dr. H. Kleimann, Dr. H. Rabe, Dr. K. Recker, Dr. H. G. Schneider, R. Stoer, Dr. Ch. Weber, Dr. K.–D. Wolf.

Reaction Polymers, Polyurethanes, Epoxies, Unsaturated Polyesters, Phenolics, Special Monomers, and Additives, (month unavailable) 1992, pp. 47–96, Edited by Wilson F. Gum, Wolfram Riese and Henri Ulrich.

*Primary Examiner*—John M. Cooney, Jr.
(74) *Attorney, Agent, or Firm*—Joseph C. Gil; John E. Mrozinski, Jr.

(57) ABSTRACT

The present invention relates to a process for the production of polyether polyols by polyaddition of alkylene oxides onto starter compounds containing active hydrogen atoms conducted in the presence of a double-metal cyanide catalyst wherein a reaction mixture is guided at least once through a zone which has an energy density of at least $10^5$ J/m$^3$ and wherein the residence time of the reaction mixture in this zone is at least $10^{-6}$ seconds per pass.

10 Claims, 2 Drawing Sheets

PROCESS FOR THE PREPARATION OF POLYETHER POLYOLS

The invention relates to an improved process for the preparation of polyether polyols in the presence of double-metal cyanide ("DMC") catalysts by polyaddition of alkylene oxides to starter compounds having active hydrogen atoms.

Polyether polyols are typically prepared industrially by polyaddition of alkylene oxides to polyfunctional starter compounds such as, for example, alcohols, acids, or amines with base catalysis (for example KOH) (see, for example, Gum, Riese & Ulrich (ed.): "Reaction Polymers", Hanser Verlag, Munich, 1992, pp. 75–96). Following completion of the polyaddition, the basic catalyst must be removed from the polyether polyol in a very elaborate process, for example, by neutralization, distillation and filtration. Moreover, polyether polyols prepared by base catalysis have the disadvantage that as chain length increases, the number of monofunctional polyethers terminating in double bonds (so-called "mono-ols") increases constantly, lowering functionality.

The polyether polyols obtained may be utilized for the production of polyurethanes (for example elastomers, foams, coatings), particularly, for the production of flexible polyurethane foams. Flexible foams offer a low resistance to compressive stress and are open-celled, air-permeable and reversibly deformable. Slabstock foams and molded foams are distinctive products (see, for example, Kunststoffhandbuch [Manual of Plastics], Vol. 7, 3rd Edition, Hanser Verlag, Munich, 1993, pp. 193–252). Slabstock foams are produced in a continuous or discontinuous process as semi-finished products and are then cut to size and shape appropriate to the application (for example, upholstered furniture, mattresses). Molded foams, on the other hand, are produced in a discontinuous process in which the foam bodies are obtained directly in the desired shape (by expansion to fill a corresponding mold).

DMC catalysts for the preparation of polyether polyols are known. (See, for example, U.S. Pat. Nos. 3,404,109, 3,829,505, 3,941,849 and 5,158,922). The use of these DMC catalysts for the preparation of polyether polyols brings about a reduction in the monofunctional polyether (mono-ol) content, by comparison with the conventional preparation of polyether polyols with basic catalysts. Improved DMC catalysts, such as are described, for example, in EP-A 700 949, EP-A 761 708, WO 97/40086, WO 98/16310, DE-A 197 45 120, DE-A 197 57 574 or DE-A 198 102 269, additionally possess exceptionally high activity and enable polyether polyols to be prepared at a very low catalyst concentration (25 ppm or less), making separation of the catalyst from the polyol unnecessary.

Polyether polyols obtained with DMC catalysis may lead to applications-related technical problems in the production of polyurethane foam, in particular, for flexible polyurethane foams, for example, causing foam destabilization (increased susceptibility to collapse) or increased coarseness of cell size. DMC-catalyzed polyether polyols are not, therefore, in all cases able to replace corresponding base-catalyzed polyols in flexible polyurethane foam applications without adaptation of the formulation.

It has now been found that polyether polyols prepared in whole or in part with DMC catalysis possess markedly improved foaming properties in the production of polyurethane foams if the polyether polyol is guided through a suitable mixing unit during the DMC-catalyzed polyaddition of alkylene oxides to starter compounds having active hydrogen atoms.

The present invention relates to an improved process for the preparation of polyether polyols, wherein the polyether polyol is prepared in whole or in part by DMC-catalyzed polyaddition of alkylene oxides to starter compounds having active hydrogen atoms wherein the polyether polyol is guided through a suitable mixing unit during the DMC-catalyzed polyaddition. The present invention also relates to the use of polyether polyols produced from the present invention for the production of polyurethane foam, in particular, flexible polyurethane foams.

The DMC catalysts which are suitable for the process according to the invention are known. See, for example, JP-A 4 145 123, EP-A 654 302, EP-A 700 949, EP-A 743 093, EP-A 761 708, WO 97/40086, WO 98/16310, WO 99/19062, WO 99/19063, WO 99/33562, DE-A 198 34 572, DE-A 198 34 573, DE-A 198 42 382, DE-A 198 42 383, DE-A 199 05 611, DE-A 199 06 985, DE-A 199 13 260, DE-A 199 20 937 or DE-A 199 24 672. A typical example is the high-activity DMC catalysts described in EP-A 700 949, which in addition to a DMC compound (for example zinc hexacyanocobaltate(III)) and an organic complexing ligand (for example tert.-butanol), also comprise a polyether polyol having a number average molecular weight greater than 500 g/mol.

Compounds having molecular weights of 18 to 2,000 g/mol, preferably 62 to 1,000 g/mol, and 1 to 8, preferably 2 to 6, hydroxyl groups are utilized as the starter compounds having active hydrogen atoms. Examples of such starter compounds include butanol, ethylene glycol, diethylene glycol, triethylene glycol, 1,2-propylene glycol, 1,4-butanediol, 1,6-hexanediol, bisphenol A, trimethylolpropane, glycerol, pentaerythritol, sorbitol, cane sugar, degraded starch, water or so-called pre-lengthened starters.

Ethylene oxide, propylene oxide and butylene oxide as well as mixtures thereof are preferably utilized as the alkylene oxides. The polyether chains may be constructed using only one monomeric epoxide or in random or block manner using 2 or 3 different monomeric epoxides. "Ullmanns Encyclopädie der industriellen Chemie" [Ullmann's Encyclopaedia of Industrial Chemistry], Vol. A21, 1992, p.670 et seq., provides further detail.

The polyaddition may in principle be carried out by any alkoxylation process known for DMC catalysis.

For example, a conventional batch process may be utilized. In this process, an initial charge of the DMC catalyst and the starter compound is introduced into the batch reactor which is then heated to the desired temperature, after which alkylene oxide is added in a quantity sufficient to activate the catalyst. As soon as the catalyst is activated (manifested, for example, by a pressure drop in the reactor), the remaining alkylene oxide is dispensed continuously into the reactor until the desired molecular weight of the polyether polyol is reached.

A continuous process may also be employed in which a pre-activated mixture of DMC catalyst and starter compound is supplied continuously to a continuous reactor, for example a continuous stirred-tank reactor ("CSTR") or a tubular flow reactor. Alkylene oxide is dispensed into the reactor and the product is withdrawn continuously.

The DMC-catalyzed polyaddition is, however, preferably carried out in a process in which the starter compound is dispensed-in continuously during the polyaddition. The DMC-catalyzed polyaddition with continuous dispensing of the starter may in this case take place in a batch process, as taught by WO 97/29146, or a continuous process, such as appears in WO 98/03571.

The DMC-catalyzed polyaddition may take place at pressures of from 0.0001 to 20 bar, preferably, 0.5 to 10 bar, more preferably, 1 to 6 bar. The reaction temperatures are from 20 to 200° C., preferably, 60 to 180° C., more preferably, 80 to 160° C.

The DMC catalyst concentration is generally from 0.0005 to 1 wt. %, preferably, 0.001 to 0.1 wt. %, more preferably, 0.001 to 0.01 wt. %, in relation to the quantity of polyether polyol to be prepared.

According to the invention, during the DMC-catalyzed polyaddition, the polyether polyol is guided through a zone of high energy density, such as arises, for example, in a suitable mixing unit. The structural principles of suitable mixing units for the treatment according to the invention of the polyether polyols is described below.

Suitable mixing units are distinguished by geometries which enable them to deliver a high local energy density to the product in the form of energy of flow. Since high pressures are frequently applied for this purpose, these mixing units are also known as high-pressure homogenizers. Mixing units which are particularly suitable for such purposes are static mixers and/or nozzle-type units. The simple perforated orifice plates, flat nozzles, serrated nozzles, knife edge nozzles, microfluidizers, such as are described in U.S. Pat. No. 4,533,254 ("the '254 patent"), which is incorporated herein by references, microstructural mixers, microstructural components or jet dispersers are particularly suitable. Further geometries which work on the same principle as these or other nozzle-type units are readily accessible to those skilled in the art. The functional principle of these nozzle-type units is explained taking a simple perforated orifice plate as an example. The product stream is compressed by a pump and is expanded through the orifice plate. The sudden narrowing of the cross section greatly accelerates the product stream in the nozzle. Depending on the geometry of the orifice plate, two forces are here able to act on the product. Either the product stream is so strongly accelerated that flow in the nozzle is turbulent, or, in the case of laminar flow, a so-called expansion flow is set up in the nozzle.

BRIEF DESCRIPTION OF DRAWINGS

Further examples of suitable nozzle-type units are illustrated in FIGS. 1 to 5 herein representing those of the '254 patent.

Figure 1:
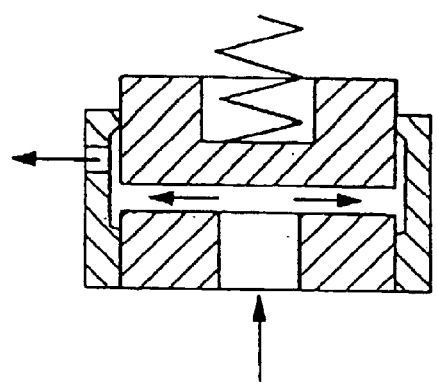
FIG. 1 which is that of the '254 patent shows a flat nozzle and FIG. 2 which is that of the '254 patent shows a knife edge nozzle, whereas FIG. 3 which is that of the '254 patent shows a microfluidizer.
Figure 2:
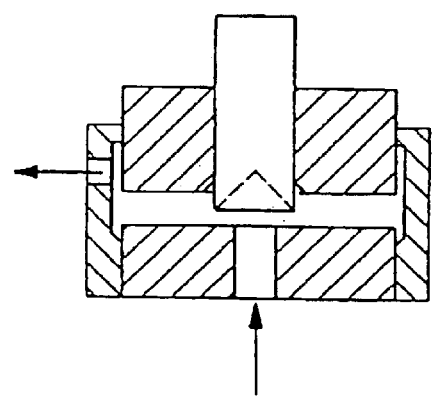
Figure 3:
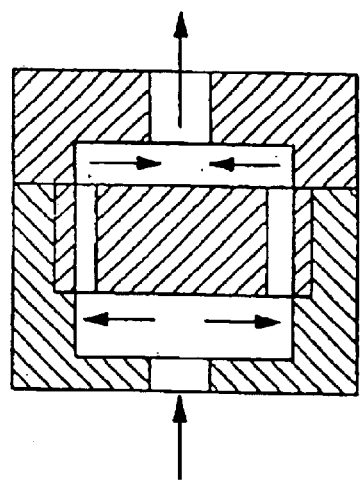
Figure 4:
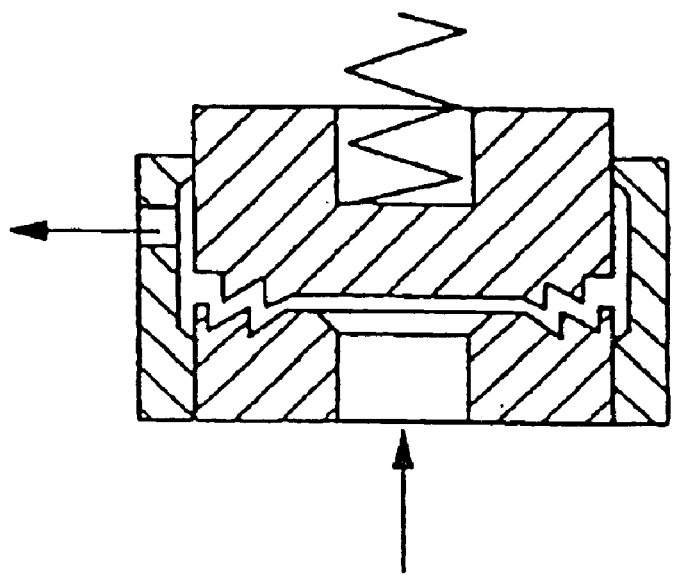
FIG. 4 which is that of the '254 patent illustrates a serrated nozzle and FIG. 5 which is that of the '254 patent illustrates a jet disperser.
Figure 5:
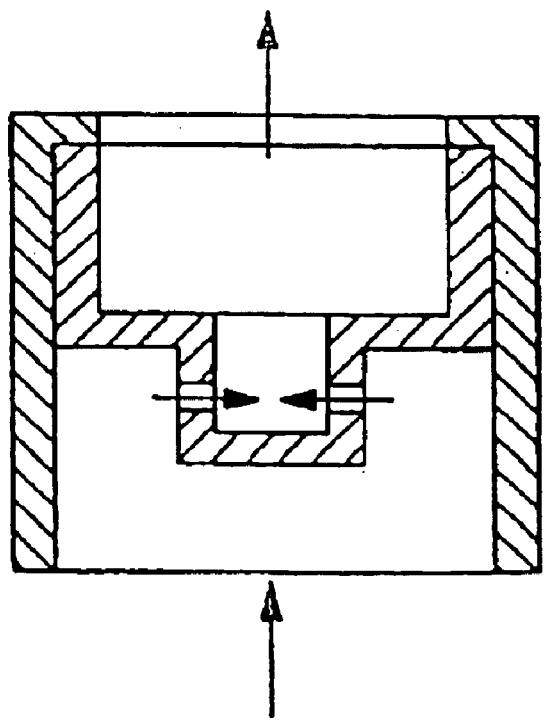

In addition to these mixing units which deliver a high energy density to the product in the form of energy of flow, such apparatus contribute a high energy density as a result of their rotating parts. Examples of such rotating parts include, for example, rotor-stator systems, ball mills, colloid mills, wet rotor mills, gear ring-type dispersing machines, intensive mixers which utilize the principle of the gear ring-type dispersing machines but with axial flow, or other apparatus which utilize rotating parts, which are readily accessible to those skilled in the art and which may be utilized for the purpose of the present invention, are likewise suitable.

Furthermore, mixing units which generate high energy densities by cavitation, as do, for example, ultrasound disintegrators, might also be used in the present invention. "Cavitation" is understood here to be the formation and collapse of vapor bubbles in a liquid in which an isothermal pressure drop occurs initially, until the vapor pressure of the liquid is reached, followed by an increase in pressure. The gas bubbles which have formed collapse again owing to the increase in pressure. The collapsing process releases the energy which is effective in comminution. In the case of polyethers, the necessary energy density can, therefore, also be obtained in this manner as a result of the addition of a liquid having a suitable vapor pressure.

Combinations of the named or similar mixing units may also be utilized.

Irrespective of the type of mixing units used, the level of energy density delivered to the product and the residence time of the product in the region of high energy densities are crucial to the process according to the invention. It has become apparent that the foaming properties of the polyether polyols obtained by the process according to the invention are improved only when certain minimum values for energy density and total residence time (the product of residence time per pass and number of passes) in the mixing aggregate are attained. It has also become apparent that if the polyether polyol is guided through a suitable mixing unit as early as during DMC-catalyzed polyaddition, this effect can be achieved at substantially lower energy densities than if the polyether polyol is not guided through the mixing unit until the polyaddition reaction has been completed. As a result, capital and maintenance costs are lower because pumps can be utilized which have a markedly lower energy requirement and lower feed pressures, thus offering pronounced cost advantages over high-pressure pumps.

In the case of nozzle-type units, the energy density $E_v$ is here determined by the pressure difference (homogenizing pressure) $\Delta p_H$ which takes effect at the nozzle. This is represented by the following formula:

$$E_v[J/m^3] = \Delta p_H$$

In the case of mixing units which work on the rotor-stator system principle, the energy density can be calculated experimentally from the power P supplied, the density $\rho$, the effective dispersing volume $V_{sp}$, and the residence time t in this volume, as follows:

$$E_v[J/m^3] = P \times \rho^{-1} \times V_{sp}^{-1} \times t$$

According to the invention, energy densities of at least $1 \times 10^5$ J/m$^3$, preferably, at least $3 \times 10^5$ J/m$^3$ and, more preferably, at least $5 \times 10^5$ J/m$^3$ should be utilized. The residence time of the product in the corresponding zones of high energy densities should be at least $1 \times 10^{-6}$ seconds. It will generally be from $1 \times 10^{-5}$ to 1 second. The polyol is passed at least once through at least one zone of high energy density. However, a plurality of passes through the mixing unit are generally effected.

The mixing units must be installed such that they engage directly with the mixing process of the alkoxylation. For this purpose, the mixing units may, for example, be introduced into a pumped circuit of the reactor. The polyether polyol is guided through the mixing units together with unreacted starter, alkylene oxide and catalyst. The reactants and the catalyst may be added independently of this mixing unit at a different point in the reactor. In order to carry out the process according to the invention, nozzles and orifice plates are preferably built into the pumped circuit. Jet dispersers are particularly preferably used. The energy density necessary in order to obtain the desired effect is independent of the reactor pressure. The energy density in the nozzle or orifice plate, proportional to the pressure loss upstream of the nozzle or orifice plate, is alone decisive.

In a further embodiment of the process according to the invention, the mixing units are used directly for mixing the educt streams with the reactor content. Jet dispersers are particularly suitable for this purpose because they generate high energy densities which enable the components to be mixed extremely rapidly. The educts, for example, a starter mixture comprising either only one component or a mixture of different suitable compounds having active hydrogen atoms, an alkylene oxide or a mixture of alkylene oxides and, optionally, a catalyst suspension, are homogenized in any suitable manner under conditions under which they do not react together, and are then mixed in the jet disperser with the polyether polyol containing the active DMC catalyst. "Suitable" in this context signifies that a homogeneous catalyst dispersion is obtained.

In a different variant, the educts are mixed with the polyether polyol containing the active DMC catalyst, in any order, if possible, sequentially at short intervals, by way of suitable mixing units. For this process regime, a plurality of nozzles switched in series are preferably utilized, with a plurality of jet dispersers switched in series being particularly preferred.

The order in which the reagents are added is not important for the purpose of achieving the object according to the invention. It is preferred that the alkylene oxide or the mixture of alkylene oxides be dispensed-in first, followed by the starter mixture comprising either only one component or a mixture of different suitable compounds having active hydrogen atoms, because in this manner possible deactivation of the active catalyst as a result of an excessive local concentration of low molecular weight starter compounds is prevented. There is no preference as to the addition of the catalyst.

The polyether polyol is generally treated in the mixing unit at temperatures of from 20 to 200° C., preferably, 60 to 180° C., more preferably, 80 to 160° C.

In the process according to the invention, the polyether polyol is prepared in whole or in part by DMC-catalyzed polyaddition of alkylene oxides to starter compounds having active hydrogen atoms.

If the polyether polyol is prepared only in part in the presence of a DMC catalysts, any alternative (acid, basic or coordination) catalyst may be utilized for the further construction of the polyether polyol.

In a conventional batch process, for example, it is advantageous to utilize, as the starter compounds for the DMC catalysis, oligomeric alkoxylation products having number average molecular weights of 200 to 2,000 g/mol. These may be prepared by alkoxylation of low molecular weight starter compounds such as, for example, 1,2-propylene glycol or glycerol with conventional base catalysis (for example KOH) or acid catalysis.

The so-called EO-Cap, in which, for example, poly(oxypropylene)polyols or poly(oxypropylene/oxyethylene) polyols are reacted with ethylene oxide in order to convert the majority of the secondary OH groups of the polyether polyol into primary OH groups, is also preferably carried out with base catalysis (for example KOH).

The polyether polyols are preferably prepared in the process according to the invention such that at least 20 wt. %, preferably at least 40 wt. % (in each case in relation to the quantities of the alkylene oxide utilized for the preparation of the polyether polyol), of the alkylene oxide utilized is reacted with DMC catalysis.

The polyether polyols prepared by the process according to the invention possess markedly improved foaming properties in the production of flexible polyurethane foams.

EXAMPLES

Preparation of the Polyether Polyols

Polyol A (Comparison):

Polyol A is a nominally trifunctional polyether polyol of molecular weight 3,000 g/mol, obtained by reacting glycerol with propylene oxide with KOH catalysis (0.41 wt. %, in relation to the quantity of finished polyether polyol) at 107° C. followed by separation of the catalyst by neutralizing with sulfuric acid, removal of water and filtration.

Polyol B (Comparison):

Polyol B is a nominally trifunctional polyether polyol of molecular weight 3,000 g/mol, obtained by reacting glycerol with propylene oxide at 130° C. with continuous dispensing of the starter compound, with DMC catalysis (30 ppm, in relation to the quantity of finished polyether polyol, of a zinc hexacyanocobaltate DMC catalyst comprising as ligands tert.-butanol and a poly(oxypropylene)diol obtained by DMC catalysis and having a number average molecular weight of 4,000 g/mol, described in EP-A 700 949, Example 1).

Polyol C:

Polyol C is a nominally trifunctional polyether polyol of molecular weight 3,000 g/mol, obtained by reacting glycerol with propylene oxide at 130° C. with continuous dispensing of the starter compound, with DMC catalysis (30 ppm, in relation to the quantity of finished polyether polyol, of a zinc hexacyanocobaltate DMC catalyst comprising, as ligands, tert.-butanol and a poly(oxypropylene)diol obtained by DMC catalysis and having a number average molecular weight of 4,000 g/mol, described in EP-A 700 949, Example 1). During the reaction, the polyether polyol was pumped with a diaphragm piston pump through a jet disperser (1 drilling, diameter 0.43 mm) having a material flow of 16 l/h. The pressure drop at the jet disperser was 10 bar, which corresponds to an energy density of $1 \times 10^6$ J/m$^3$.

Production of the Flexible Polyurethane Foams:

The following materials were utilized for a comparative test series:

Polyol A (Comparison)
Polyol B (Comparison)
Polyol C

| | |
|---|---|
| TDI: | Isomer mixture of 2,4-toluylene diisocyanate and 2,6-toluylene diisocyanate in the ratio 80:20, commercially available under the name DESMODUR ® T80 (Bayer AG, D-51368 Leverkusen) |
| Catalyst 1: | Bis(dimethylamino)ethyl ether |
| Silicone stabilizer 1: | TEGOSTAB ® BF 2370 (Th. Goldschmidt AG, D-45127 Essen) |
| Catalyst 2: | Tin octoate catalyst, commercially available as DESMORAPID ® SO (Rheinchemie Rheinau GmbH, D-68219 Mannheim) |

The following formulation for the production of a flexible polyurethane foam was utilized:

| Feed material | Quantity [g] |
|---|---|
| Polyol A, B or C | 100.0 |
| Water | 6.0 |
| Silicone stabilizer 1 | 0.6 |

-continued

| Feed material | Quantity [g] |
|---|---|
| Catalyst 1 | 0.1 |
| Catalyst 2 | 0.15 |
| TDI | 73.4 |

Method of Production:

All the feed materials, except TDI, were first mixed for 20 seconds in a high-speed stirrer. The TDI was then added, and the mixture was homogenized by stirring for 5 seconds. The foaming mixture was placed in an open paper-lined mold having a base measuring 27 cm×13 cm and after foaming was stored for 30 minutes in a drying cabinet heated to 100° C. After cooling, the foam was cut open in the center and was evaluated visually.

| Example No. | Polyol | Foam evaluation |
|---|---|---|
| 1 (Comparison) | A | Fine, regular cell structure, crack-free, no collapse |
| 2 (Comparison) | B | Coarse, irregular cell structure, partial collapse |
| 3 | C | Fine, regular cell structure, crack-free, no collapse |

As a result of the jet disperser treatment according to the invention of the DMC-catalyzed polyol, a product (polyol C) is obtained which, unlike the untreated product (polyol B), can be processed unproblematically to give a flexible polyurethane foam. Polyol C yields a flexible polyurethane foam of a quality similar to that of the foam produced with conventional polyol A while its production does not require extensive work-up steps.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A process for the production of polyether polyols by polyaddition of an alkylene oxide onto a starter compound containing active hydrogen atoms conducted in the presence of a double metal cyanide catalyst comprising conducting a reaction mixture comprising alkylene oxide and starter compound at least once through a zone which has an energy density of at least $10^5$ J/m$^3$, wherein the residence time of the reaction mixture in this zone is at least $10^{-6}$ seconds per pass.

2. The process according to claim 1, wherein the reaction mixture is guided through the high energy density zone at least twice.

3. The process according to claim 1, wherein the energy density in the high energy density zone is at least $5\times10^5$ J/m$^3$.

4. The process according to claim 1, wherein the residence time in the high energy density zone is from $10^{-5}$ to 1 second.

5. The process according to claim 1, wherein the reaction of at least 20 wt. %, based on the total amount of alkylene oxide used, is catalyzed by the double-metal cyanide catalyst.

6. A polyether polyol produced by the process of claim 1.

7. A polyurethane foam produced by reacting the polyether polyol of claim 6 with a polyisocyanate.

8. A process for the production of polyether polyols by polyaddition of an alkylene oxide onto a starter compound containing active hydrogen atoms conducted partly in the presence of a double metal cyanide catalyst comprising conducting a reaction mixture comprising alkylene oxide and starter compound at least once through a zone which has an energy density of at least $10^5$ J/m$^3$, wherein the residence time of the reaction mixture in this zone is at least $10^{-6}$ seconds per pass.

9. A polyether polyol produced by the process of claim 8.

10. A polyurethane foam produced by reacting the polyether polyol of claim 8 with a polyisocyanate.

* * * * *